US009182814B2

(12) United States Patent
Kipman et al.

(10) Patent No.: US 9,182,814 B2
(45) Date of Patent: Nov. 10, 2015

(54) SYSTEMS AND METHODS FOR ESTIMATING A NON-VISIBLE OR OCCLUDED BODY PART

(75) Inventors: Alex A. Kipman, Duvall, WA (US); Kathryn Stone Perez, Shoreline, WA (US); Mark J. Finocchio, Redmond, WA (US); Ryan Michael Geiss, San Jose, CA (US); Kudo Tsunoda, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 839 days.

(21) Appl. No.: 12/492,457

(22) Filed: Jun. 26, 2009

(65) Prior Publication Data

US 2010/0303302 A1     Dec. 2, 2010

Related U.S. Application Data

(60) Provisional application No. 61/182,666, filed on May 29, 2009.

(51) Int. Cl.
*G06K 9/00* (2006.01)
*G06F 3/01* (2006.01)

(52) U.S. Cl.
CPC ............ *G06F 3/011* (2013.01); *G06K 9/00369* (2013.01)

(58) Field of Classification Search
None
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |

(Continued)

FOREIGN PATENT DOCUMENTS

| CN | 101254344 B | 6/2010 |
| EP | 0583061 A2 | 2/1994 |

(Continued)

OTHER PUBLICATIONS

Qian et al., "A Gesture-Driven Multimodal Interactive Dance System", IEEE International Conference on Multimedia and Expo, Taipei, Jun. 2004, 3, 1579-1582.

(Continued)

*Primary Examiner* — Avinash Yentrapati
(74) *Attorney, Agent, or Firm* — Judy Yee; Micky Minhas

(57) ABSTRACT

A depth image of a scene may be received, observed, or captured by a device. The depth image may include a human target that may have, for example, a portion thereof non-visible or occluded. For example, a user may be turned such that a body part may not be visible to the device, may have one or more body parts partially outside a field of view of the device, may have a body part or a portion of a body part behind another body part or object, or the like such that the human target associated with the user may also have a portion body part or a body part non-visible or occluded in the depth image. A position or location of the non-visible or occluded portion or body part of the human target associated with the user may then be estimated.

18 Claims, 13 Drawing Sheets

(56) References Cited

U.S. PATENT DOCUMENTS

| | | | | |
|---|---|---|---|---|
| 4,843,568 | A | 6/1989 | Krueger et al. | |
| 4,893,183 | A | 1/1990 | Nayar | |
| 4,901,362 | A | 2/1990 | Terzian | |
| 4,925,189 | A | 5/1990 | Braeunig | |
| 5,101,444 | A | 3/1992 | Wilson et al. | |
| 5,148,154 | A | 9/1992 | MacKay et al. | |
| 5,184,295 | A | 2/1993 | Mann | |
| 5,229,754 | A | 7/1993 | Aoki et al. | |
| 5,229,756 | A | 7/1993 | Kosugi et al. | |
| 5,239,463 | A | 8/1993 | Blair et al. | |
| 5,239,464 | A | 8/1993 | Blair et al. | |
| 5,288,078 | A | 2/1994 | Capper et al. | |
| 5,295,491 | A | 3/1994 | Gevins | |
| 5,320,538 | A | 6/1994 | Baum | |
| 5,347,306 | A | 9/1994 | Nitta | |
| 5,385,519 | A | 1/1995 | Hsu et al. | |
| 5,405,152 | A | 4/1995 | Katanics et al. | |
| 5,417,210 | A | 5/1995 | Funda et al. | |
| 5,423,554 | A | 6/1995 | Davis | |
| 5,454,043 | A | 9/1995 | Freeman | |
| 5,469,740 | A | 11/1995 | French et al. | |
| 5,495,576 | A | 2/1996 | Ritchey | |
| 5,516,105 | A | 5/1996 | Eisenbrey et al. | |
| 5,524,637 | A | 6/1996 | Erickson et al. | |
| 5,534,917 | A | 7/1996 | MacDougall | |
| 5,563,988 | A | 10/1996 | Maes et al. | |
| 5,577,981 | A | 11/1996 | Jarvik | |
| 5,580,249 | A | 12/1996 | Jacobsen et al. | |
| 5,594,469 | A | 1/1997 | Freeman et al. | |
| 5,597,309 | A | 1/1997 | Riess | |
| 5,616,078 | A | 4/1997 | Oh | |
| 5,617,312 | A | 4/1997 | Iura et al. | |
| 5,638,300 | A | 6/1997 | Johnson | |
| 5,641,288 | A | 6/1997 | Zaenglein | |
| 5,682,196 | A | 10/1997 | Freeman | |
| 5,682,229 | A | 10/1997 | Wangler | |
| 5,690,582 | A | 11/1997 | Ulrich et al. | |
| 5,703,367 | A | 12/1997 | Hashimoto et al. | |
| 5,704,837 | A | 1/1998 | Iwasaki et al. | |
| 5,715,834 | A | 2/1998 | Bergamasco et al. | |
| 5,875,108 | A | 2/1999 | Hoffberg et al. | |
| 5,877,803 | A | 3/1999 | Wee et al. | |
| 5,913,727 | A | 6/1999 | Ahdoot | |
| 5,933,125 | A | 8/1999 | Fernie | |
| 5,940,538 | A | * 8/1999 | Spiegel et al. | 382/236 |
| 5,980,256 | A | 11/1999 | Carmein | |
| 5,989,157 | A | 11/1999 | Walton | |
| 5,995,649 | A | 11/1999 | Marugame | |
| 6,005,548 | A | 12/1999 | Latypov et al. | |
| 6,009,210 | A | 12/1999 | Kang | |
| 6,054,991 | A | 4/2000 | Crane et al. | |
| 6,057,909 | A | 5/2000 | Yahav et al. | |
| 6,066,075 | A | 5/2000 | Poulton | |
| 6,072,494 | A | 6/2000 | Nguyen | |
| 6,073,489 | A | 6/2000 | French et al. | |
| 6,077,201 | A | 6/2000 | Cheng et al. | |
| 6,098,458 | A | 8/2000 | French et al. | |
| 6,100,517 | A | 8/2000 | Yahav et al. | |
| 6,100,896 | A | 8/2000 | Strohecker et al. | |
| 6,101,289 | A | 8/2000 | Kellner | |
| 6,115,052 | A | * 9/2000 | Freeman et al. | 345/473 |
| 6,128,003 | A | 10/2000 | Smith et al. | |
| 6,130,677 | A | 10/2000 | Kunz | |
| 6,141,463 | A | 10/2000 | Covell et al. | |
| 6,147,678 | A | 11/2000 | Kumar et al. | |
| 6,152,856 | A | 11/2000 | Studor et al. | |
| 6,159,100 | A | 12/2000 | Smith | |
| 6,173,066 | B1 | 1/2001 | Peurach et al. | |
| 6,181,343 | B1 | 1/2001 | Lyons | |
| 6,188,777 | B1 | 2/2001 | Darrell et al. | |
| 6,215,890 | B1 | 4/2001 | Matsuo et al. | |
| 6,215,898 | B1 | 4/2001 | Woodfill et al. | |
| 6,226,396 | B1 | 5/2001 | Marugame | |
| 6,229,913 | B1 | 5/2001 | Nayar et al. | |
| 6,252,974 | B1 | * 6/2001 | Martens et al. | 382/107 |
| 6,256,033 | B1 | * 7/2001 | Nguyen | 715/863 |
| 6,256,400 | B1 | 7/2001 | Takata et al. | |
| 6,283,860 | B1 | 9/2001 | Lyons et al. | |
| 6,289,112 | B1 | 9/2001 | Jain et al. | |
| 6,299,308 | B1 | 10/2001 | Voronka et al. | |
| 6,308,565 | B1 | 10/2001 | French et al. | |
| 6,316,934 | B1 | 11/2001 | Amorai-Moriya et al. | |
| 6,363,160 | B1 | 3/2002 | Bradski et al. | |
| 6,384,819 | B1 | 5/2002 | Hunter | |
| 6,411,744 | B1 | 6/2002 | Edwards | |
| 6,430,997 | B1 | 8/2002 | French et al. | |
| 6,476,834 | B1 | 11/2002 | Doval et al. | |
| 6,492,986 | B1 | * 12/2002 | Metaxas et al. | 345/420 |
| 6,496,598 | B1 | 12/2002 | Harman | |
| 6,498,628 | B2 | 12/2002 | Iwamura | |
| 6,502,515 | B2 | 1/2003 | Burckhardt et al. | |
| 6,503,195 | B1 | 1/2003 | Keller et al. | |
| 6,512,838 | B1 | 1/2003 | Rafii et al. | |
| 6,539,931 | B2 | 4/2003 | Trajkovic et al. | |
| 6,570,555 | B1 | 5/2003 | Prevost et al. | |
| 6,633,294 | B1 | 10/2003 | Rosenthal et al. | |
| 6,640,202 | B1 | 10/2003 | Dietz et al. | |
| 6,661,918 | B1 | 12/2003 | Gordon et al. | |
| 6,674,877 | B1 | * 1/2004 | Jojic et al. | 382/103 |
| 6,681,031 | B2 | 1/2004 | Cohen et al. | |
| 6,714,665 | B1 | 3/2004 | Hanna et al. | |
| 6,731,799 | B1 | 5/2004 | Sun et al. | |
| 6,738,066 | B1 | 5/2004 | Nguyen | |
| 6,765,726 | B2 | 7/2004 | French et al. | |
| 6,771,277 | B2 | 8/2004 | Ohba | |
| 6,788,809 | B1 | 9/2004 | Grzeszczuk et al. | |
| 6,801,637 | B2 | 10/2004 | Voronka et al. | |
| 6,873,723 | B1 | 3/2005 | Aucsmith et al. | |
| 6,876,496 | B2 | 4/2005 | French et al. | |
| 6,937,742 | B2 | 8/2005 | Roberts et al. | |
| 6,950,534 | B2 | 9/2005 | Cohen et al. | |
| 7,003,134 | B1 | 2/2006 | Covell et al. | |
| 7,003,136 | B1 | * 2/2006 | Harville | 382/103 |
| 7,006,236 | B2 | 2/2006 | Tomasi et al. | |
| 7,036,094 | B1 | 4/2006 | Cohen et al. | |
| 7,038,855 | B2 | 5/2006 | French et al. | |
| 7,039,676 | B1 | 5/2006 | Day et al. | |
| 7,042,440 | B2 | 5/2006 | Pryor et al. | |
| 7,050,177 | B2 | 5/2006 | Tomasi et al. | |
| 7,050,606 | B2 | 5/2006 | Paul et al. | |
| 7,058,204 | B2 | 6/2006 | Hildreth et al. | |
| 7,060,957 | B2 | 6/2006 | Lange et al. | |
| 7,113,918 | B1 | 9/2006 | Ahmad et al. | |
| 7,121,946 | B2 | 10/2006 | Paul et al. | |
| 7,151,530 | B2 | 12/2006 | Roeber et al. | |
| 7,158,656 | B2 | * 1/2007 | Covell et al. | 382/106 |
| 7,170,492 | B2 | 1/2007 | Bell | |
| 7,184,048 | B2 | 2/2007 | Hunter | |
| 7,202,898 | B1 | 4/2007 | Braun et al. | |
| 7,222,078 | B2 | 5/2007 | Abelow | |
| 7,224,384 | B1 | 5/2007 | Iddan et al. | |
| 7,227,526 | B2 | * 6/2007 | Hildreth et al. | 345/156 |
| 7,257,237 | B1 | * 8/2007 | Luck et al. | 382/103 |
| 7,257,272 | B2 | * 8/2007 | Blake et al. | 382/275 |
| 7,259,747 | B2 | 8/2007 | Bell | |
| 7,293,356 | B2 | 11/2007 | Sohn et al. | |
| 7,308,112 | B2 | * 12/2007 | Fujimura et al. | 382/103 |
| 7,310,431 | B2 | 12/2007 | Gokturk et al. | |
| 7,317,836 | B2 | * 1/2008 | Fujimura et al. | 382/203 |
| 7,340,077 | B2 | 3/2008 | Gokturk et al. | |
| 7,348,963 | B2 | 3/2008 | Bell | |
| 7,359,121 | B2 | 4/2008 | French et al. | |
| 7,367,887 | B2 | 5/2008 | Watabe et al. | |
| 7,372,977 | B2 | * 5/2008 | Fujimura et al. | 382/103 |
| 7,379,563 | B2 | 5/2008 | Shamaie | |
| 7,379,566 | B2 | 5/2008 | Hildreth | |
| 7,389,591 | B2 | 6/2008 | Jaiswal et al. | |
| 7,412,077 | B2 | 8/2008 | Li et al. | |
| 7,421,093 | B2 | 9/2008 | Hildreth et al. | |
| 7,430,312 | B2 | 9/2008 | Gu | |
| 7,436,496 | B2 | 10/2008 | Kawahito | |
| 7,450,736 | B2 | 11/2008 | Yang et al. | |
| 7,452,275 | B2 | 11/2008 | Kuraishi | |
| 7,460,690 | B2 | 12/2008 | Cohen et al. | |

(56) References Cited

U.S. PATENT DOCUMENTS

| | | |
|---|---|---|
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 * | 9/2009 | Fujimura et al. ............... 382/104 |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 7,961,174 B1 * | 6/2011 | Markovic et al. ............. 345/158 |
| 7,961,934 B2 * | 6/2011 | Thrun et al. .................. 382/154 |
| 7,965,867 B2 * | 6/2011 | Lanz ............................ 382/103 |
| 7,971,156 B2 * | 6/2011 | Albertson et al. ........... 715/863 |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,114,172 B2 * | 2/2012 | Givon .............................. 48/49 |
| 8,145,594 B2 * | 3/2012 | Geisner et al. ............... 707/607 |
| 8,515,132 B2 * | 8/2013 | Shamaie ...................... 382/103 |
| 2003/0044045 A1 * | 3/2003 | Schoepflin et al. .......... 382/103 |
| 2003/0099375 A1 * | 5/2003 | Sefcik ........................... 382/103 |
| 2004/0207597 A1 | 10/2004 | Marks |
| 2005/0059488 A1 | 3/2005 | Larsen et al. |
| 2005/0128197 A1 | 6/2005 | Thrun et al. |
| 2005/0238201 A1 * | 10/2005 | Shamaie ...................... 382/103 |
| 2006/0010400 A1 * | 1/2006 | Dehlin et al. ................. 715/856 |
| 2006/0188144 A1 | 8/2006 | Sasaki et al. |
| 2006/0239558 A1 | 10/2006 | Rafii et al. |
| 2006/0269145 A1 * | 11/2006 | Roberts ........................ 382/228 |
| 2007/0013718 A1 | 1/2007 | Ohba |
| 2007/0024635 A1 * | 2/2007 | Jojic et al. ..................... 345/589 |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0260984 A1 | 11/2007 | Marks et al. |
| 2007/0268295 A1 | 11/2007 | Okada |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0031492 A1 * | 2/2008 | Lanz ............................ 382/103 |
| 2008/0062257 A1 | 3/2008 | Corson |
| 2008/0100620 A1 | 5/2008 | Nagai et al. |
| 2008/0126937 A1 | 5/2008 | Pachet |
| 2008/0134102 A1 | 6/2008 | Movold et al. |
| 2008/0152191 A1 * | 6/2008 | Fujimura et al. ............. 382/103 |
| 2008/0215972 A1 | 9/2008 | Zalewski et al. |
| 2008/0215973 A1 | 9/2008 | Zalewski et al. |
| 2008/0219502 A1 * | 9/2008 | Shamaie ...................... 382/103 |
| 2008/0300055 A1 * | 12/2008 | Lutnick et al. .................. 463/39 |
| 2009/0079813 A1 * | 3/2009 | Hildreth ...................... 348/14.03 |
| 2009/0080780 A1 | 3/2009 | Ikeda |
| 2009/0141933 A1 | 6/2009 | Wagg |
| 2009/0167679 A1 | 7/2009 | Klier et al. |
| 2009/0175540 A1 * | 7/2009 | Dariush et al. ............... 382/195 |
| 2009/0221368 A1 | 9/2009 | Yen et al. |
| 2009/0252423 A1 * | 10/2009 | Zhu et al. ..................... 382/209 |
| 2009/0304229 A1 * | 12/2009 | Hampapur et al. .......... 382/103 |

FOREIGN PATENT DOCUMENTS

| | | |
|---|---|---|
| JP | 08044490 A | 2/1996 |
| WO | WO 93/10708 A1 | 6/1993 |
| WO | WO 97/17598 A1 | 5/1997 |
| WO | WO 99/15863 A1 | 4/1999 |
| WO | WO 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2008/057107 A2 | 5/2008 |
| WO | WO 2008/115534 A1 | 9/2008 |
| WO | WO 2009/059065 A1 | 5/2009 |

OTHER PUBLICATIONS

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Beck et al., "Object Segmentation from Motion Discontinuities and Temporal Occlusions—A Biologically Inspired Model", Motion Based Segmentation, Institute for Neural Information Processing, University of Ulm, Ulm, Germany, PLoS One, Nov. 2008, 3(11), 1-14.

Dockstader et al., "Multiple Camera Tracking of Interacting and Occluded Human Motion", Invited Paper, Proceedings of the IEEE, Oct. 2001, 89(10), 1441-1455.

Gavrila et al., "Towards 3D Model Based Tracking and Recognition of Human Movement a Multi View Approach", Appears in International Workshop on Face and Gesture Recognition, Zurich, (no month available) 1995, 6 pages.

Rehg et al., "Model-Based Tracking of Self-Occluding Articulated Objects", Proceedings of the Fifth International Conference on Computer Vision, IEEE, (no month available) 1995, 612-617.

Sminchisescu et al., "Covariance Scaled Sampling for Monocular 3D Body Tracking", IEEE Computer Society Conference on Computer Vision and Pattern Recognition (CVPR'01), Dec. 8-14, 2001, 447-454.

Wang et al., "Human Posture Analysis under Partial Self-Occlusion", School of Computing, National University of Singapore, Proceedings of Third international conference, ICIAR 2006, Sep. 18-20, 2006, 4141, 874-885.

"Virtual High Anxiety", Tech Update, Aug. 1995, pp. 24.

Aggarwal et al., "Human Motion Analysis: A Review", IEEE Nonrigid and Articulated Motion Workshop, 1997, University of Texas at Austin, Austin, TX.; p. 90-102.

Azarbayejani et al., "Visually Controlled Graphics", Jun. 1993, vol. 15, No. 6, IEEE Transactions on Pattern Analysis and Machine Intelligence.; p. 602-605.

Breen et al., "Interactive Occlusion and Collusion of Real and Virtual Objects in Augmented Reality", Technical Report ECRC-95-02, 1995, European Computer-Industry Research Center GmbH, Munich, Germany.; 22 pages.

Brogan et al., "Dynamically Simulated Characters in Virtual Environments", Sep./Oct. 1998, pp. 2-13, vol. 18, Issue 5, IEEE Computer Graphics and Applications.; p. 58-69.

Fisher et al., "Virtual Environment Display System", ACM Workshop on Interactive 3D Graphics, Oct. 1986, Chapel Hill, NC.; 12 pp. 1.

Freeman et al., "Television Control by Hand Gestures", Dec. 1994, Mitsubishi Electric Research Laboratories, TR94-24, Cambridge, MA.; 7 pages.

Granieri et al., "Simulating Humans in VR", The British Computer Society, Oct. 1994, Academic Press.; 15 pages.

(56) References Cited

OTHER PUBLICATIONS

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.; 12 pages.
He, "Generation of Human Body Models", Apr. 2005, University of Auckland, New Zealand; 111 pages.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Isard et al., "Condensation—Conditional Density Propagation for Visual Tracking", 1998, pp. 5-28, International Journal of Computer Vision 29(1), Netherlands.
Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.
Kohler, "Special Topics of Gesture Recognition Applied in Intelligent Home Environments", In Proceedings of the Gesture Workshop, 1998, pp. 285-296, Germany.
Kohler, "Technical Details and Ergonomical Aspects of Gesture Recognition applied in Intelligent Home Environments", 1997, Germany.; 35 pages.
Kohler, "Vision Based Remote Control in Intelligent Home Environments", University of Erlangen-Nuremberg/Germany, 1996, pp. 147-154, Germany.
Livingston, "Vision-based Tracking with Dynamic Structured Light for Video See-through Augmented Reality", 1998, University of North Carolina at Chapel Hill, North Carolina, USA.; 145 pages.
Miyagawa et al., "CCD-Based Range Finding Sensor", Oct. 1997, pp. 1648-1652, vol. 44 No. 10, IEEE Transactions on Electron Devices.
Pavlovic et al., "Visual Interpretation of Hand Gestures for Human-Computer Interaction; A Review", Jul. 1997, pp. 677-695, vol. 19, No. 7, IEEE Transactions on Pattern Analysis and Machine Intelligence.
Rosenhahn et al., "Automatic Human Model Generation", 2005, pp. 41-48, University of Auckland (CITR), New Zealand.
Shao et al., "An Open System Architecture for a Multimedia and Multimodal User interface", Aug. 24, 1998, Japanese Society for Rehabilitation of Persons with Disabilities (JSRPD), Japan.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Cambridge, MA.
Zhao, "Dressed Human Modeling, Detection, and Parts Localization", Jul. 2001, The Robotics Institute, Carnegie Mellon University, Pittsburgh, PA.; 121 pages.

\* cited by examiner

SYSTEMS AND METHODS FOR ESTIMATING A NON-VISIBLE OR OCCLUDED BODY PART

CROSS-REFERENCE TO RELATED APPLICATIONS

This application claims benefit under 35 U.S.C. §119(e) of U.S. Provisional Patent Application No. 61/182,666, filed on May 29, 2009, the disclosure of which is incorporated herein by reference.

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

Disclosed herein are systems and methods for tracking a user in a scene. For example, an image such as depth of a scene may be received or observed. The depth image may then be analyzed to determine whether the image includes a human target associated with a user. If the image includes a human target associated with a user, a model of the user may be generated. The model may then be tracked in response to movement of the user such that the model may be adjusted to mimic a movement made by the user. For example, the model may be a skeletal model having joints and bones that may be adjusted into poses corresponding to a pose of the user in physical space. According to an example embodiment, the model may be tracked by adjusting the model based on the human target in depth images received or observed in subsequent frames.

According to an example embodiment, upon receiving a depth image, a determination may be made as to whether a portion of the human target such as one or more body parts of the human target associated with the user may be non-visible or occluded in the depth image. For example, the user may move his or her right arm behind his or her back such that at least a portion of the right arm of the human target associated with the user may be non-visible or occluded in a depth image. The user may also turn sideways such that an arm of the human target associated with the user may be behind the torso of the human target in the depth image. According to another embodiment, the user may move a body part behind a body part of another user or object such as a table, a chair, or the like in the scene such that the body part of the human target associated with the user may be behind another human target in the depth image or behind object such as a table, a chair, or the like in the depth image.

In one embodiment, if a portion of the human target may be non-visible or occluded a location or a position of the non-visible or occluded body part may be estimated or predicted based on one or more non-occluded body parts, a classification tree that may be used to identify one or more visible body parts associated with pixels of a human target, historical data, or the like. According to an example, embodiment, the model may then be processed with the estimated body part.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION OF ILLUSTRATIVE EMBODIMENTS

Figure 1A:
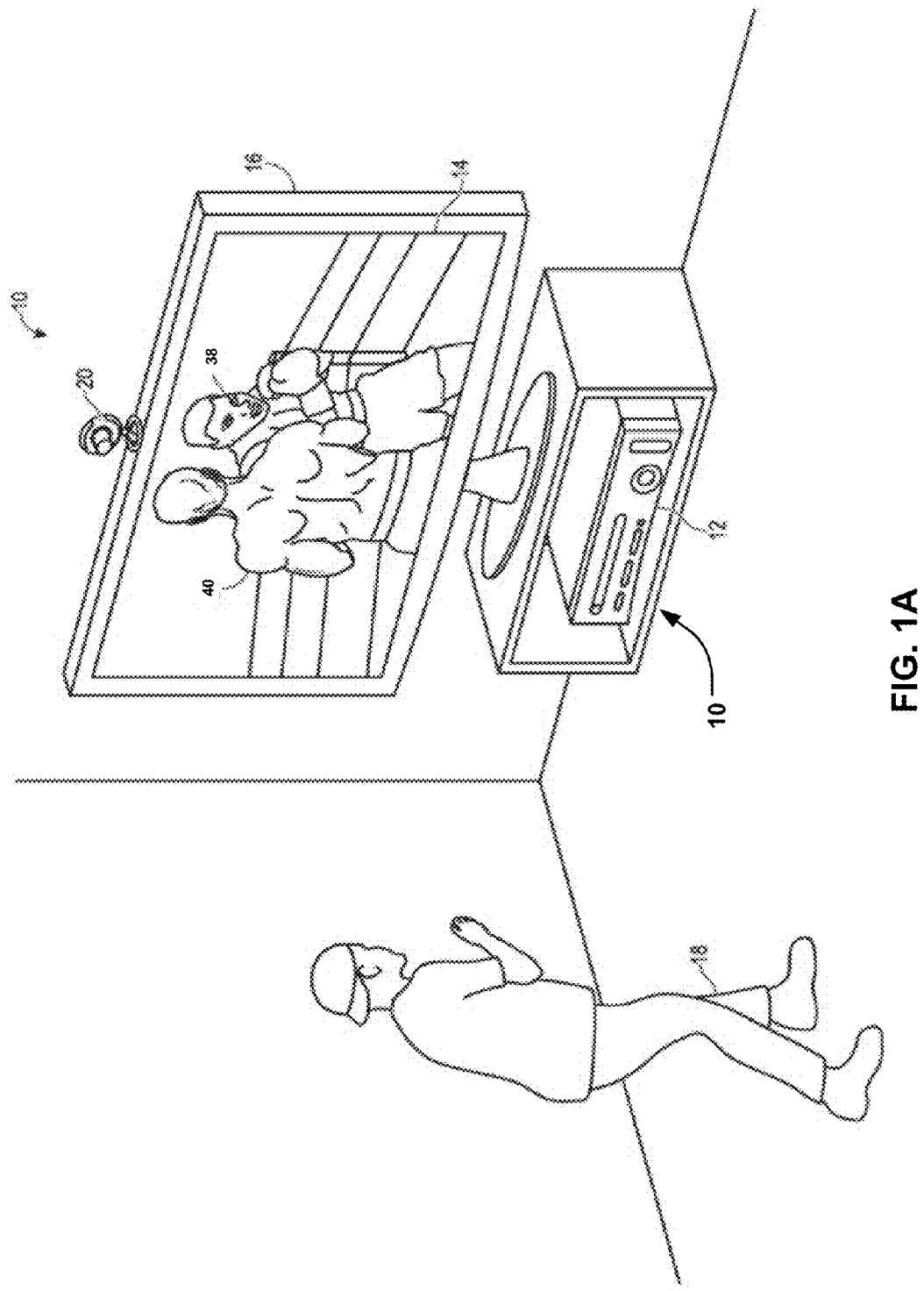
FIGS. 1A and 1B illustrate an example embodiment of a target recognition, analysis, and tracking system with a user playing a game.
Figure 1B:
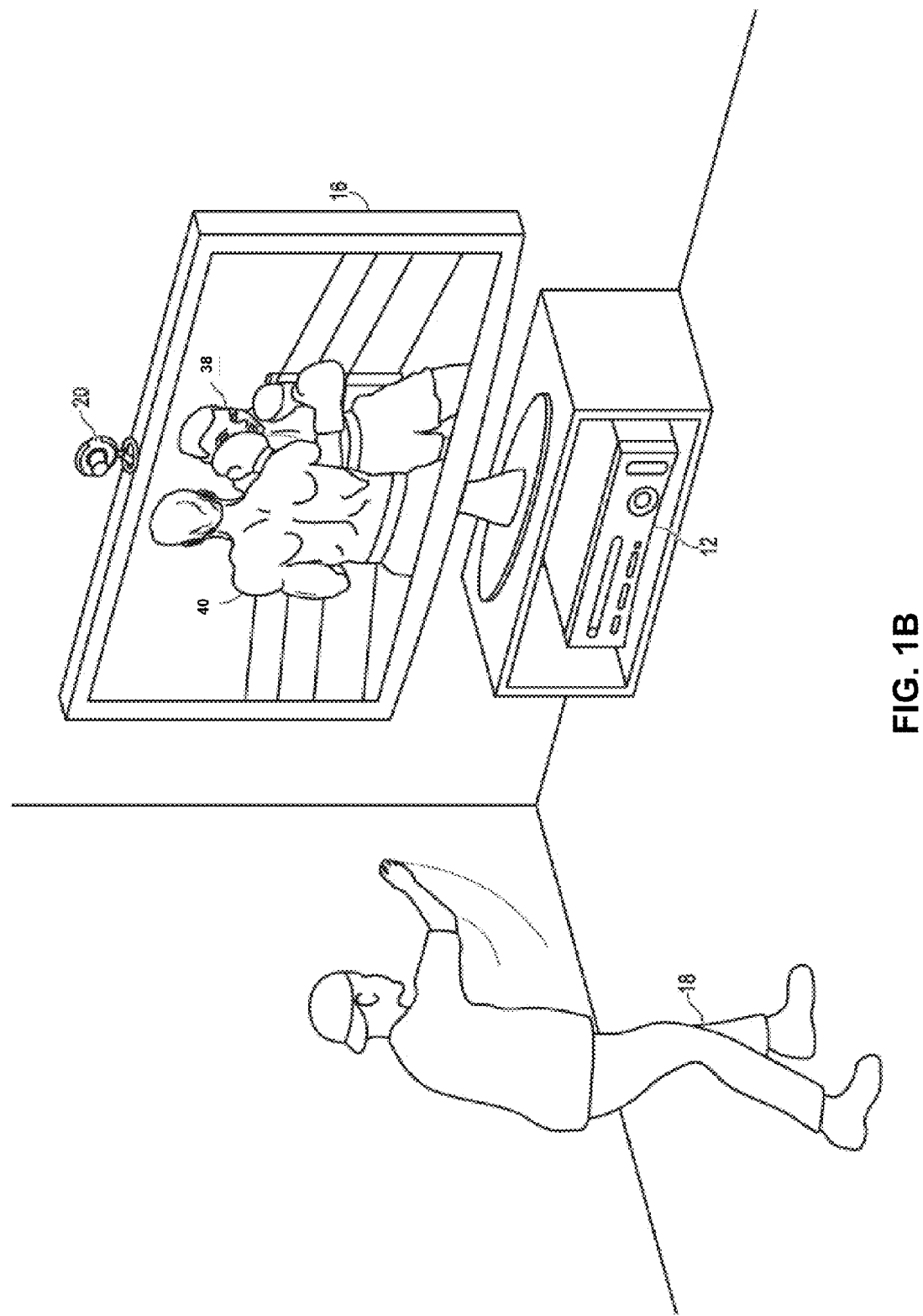

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like. In one embodiment, the computing environment 12 may include a processor such as a standardized processor, a specialized processor, a microprocessor, or the like that may execute instructions including, for example, instructions for receiving a depth image, removing a background of the depth image to isolate a human target, determining whether a portion of the human target may be occluded, and estimating the occluded portion of the human target, or any other suitable instruction, which will be described in more detail below.

As shown in FIG. 1A, the target recognition, analysis, and tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within an application and/or animate an avatar or on-screen character, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 40 in game space and/or the motion of the punch may be used to animate the player avatar 40 in game space.

Other movements by the user 18 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 40. For example, the player may use movements to end, pause, or save a game, select a level, view high scores, communicate with a friend, etc. Additionally, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
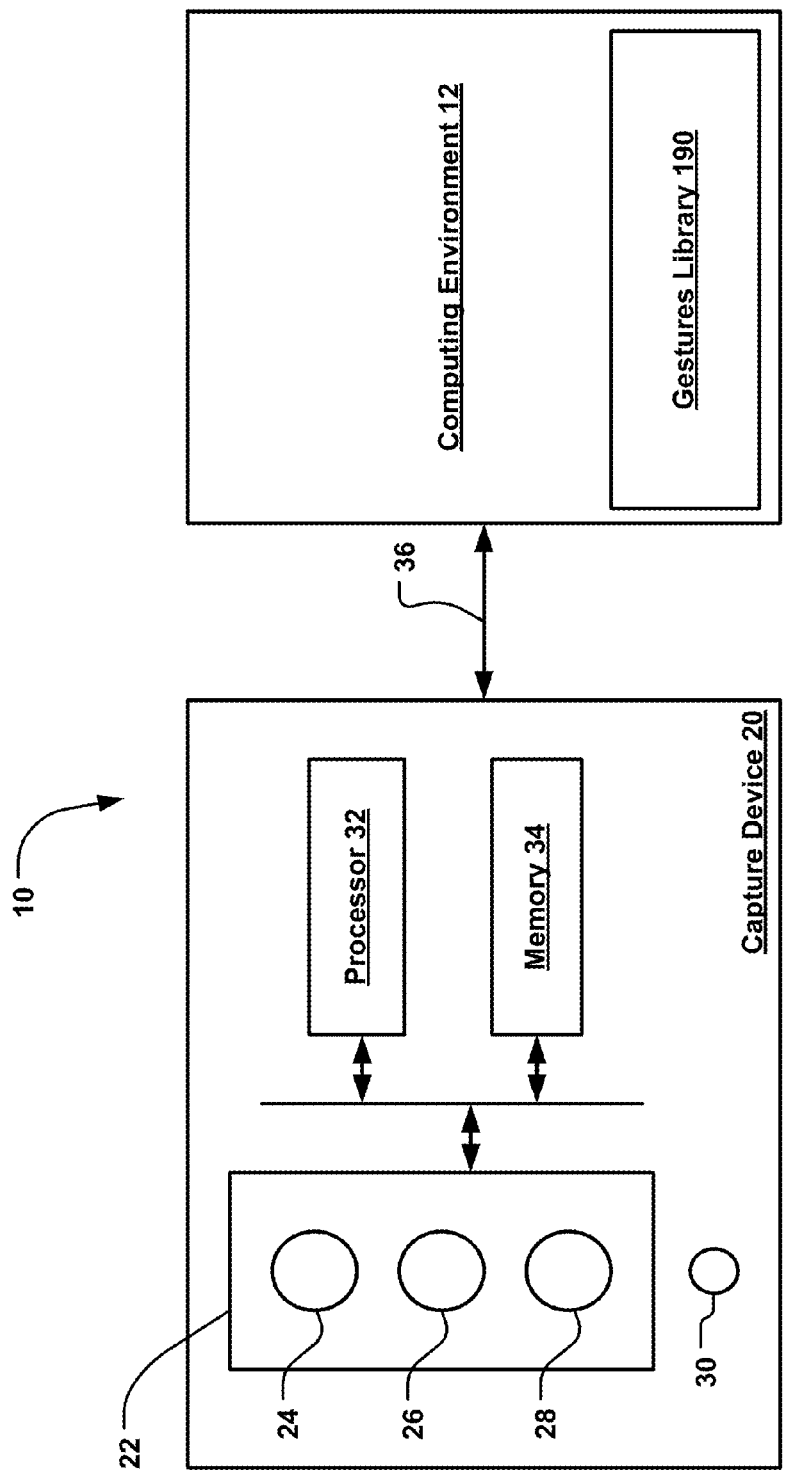
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions including, for example, instructions for receiving a depth image, removing a background of the depth image to isolate a human target, determining whether a portion of the human target may be occluded, and estimating the occluded portion of the human target, or any other suitable instruction, which will be described in more detail below.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and/or a skeletal model that may be generated by the capture device 20 to the computing environment 12 via the communication link 36. The computing environment 12 may then use the model, depth information, and captured images to, for example, control an application such as a game or word processor and/or animate an avatar or on-screen character. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 28 and the capture device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and to control an application based on the movements.

Figure 3:
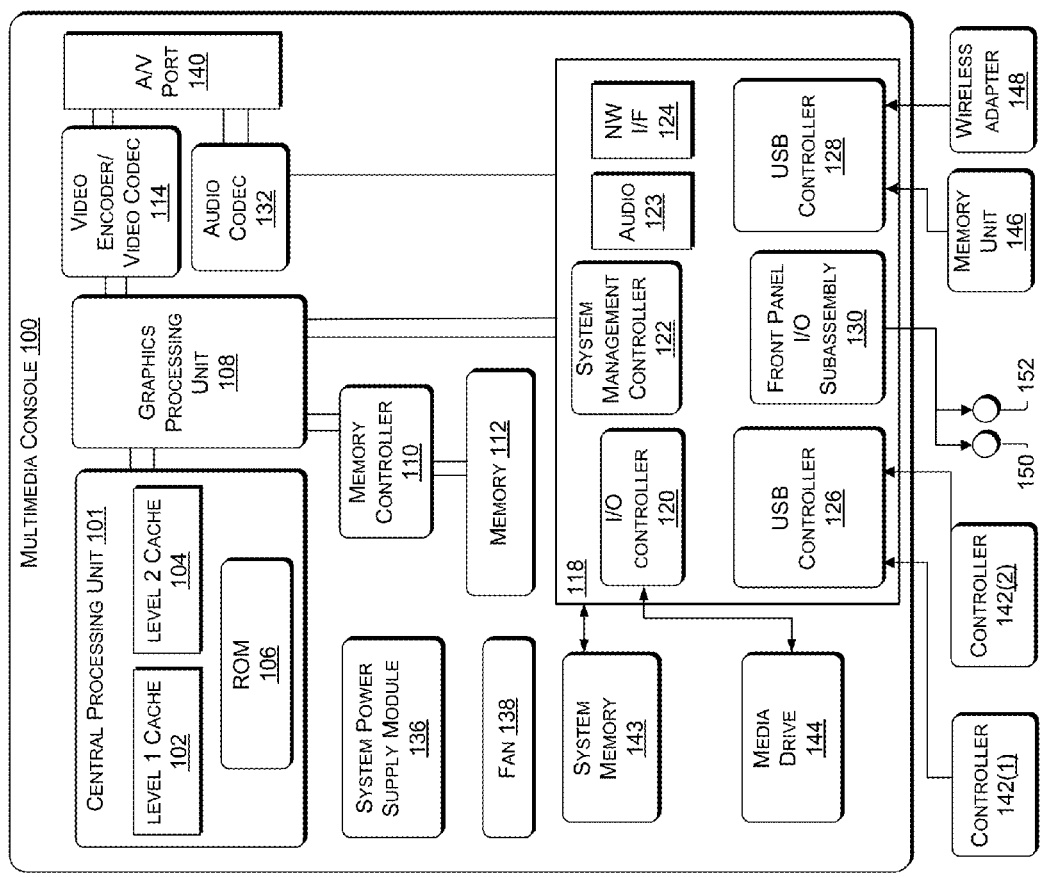
FIG. 3 illustrates an example embodiment of a computing environment that may be used to interpret one or more gestures in a target recognition, analysis, and tracking system and/or animate an avatar or on-screen character displayed by a target recognition, analysis, and tracking system.

FIG. 3 illustrates an example embodiment of a computing environment that may be used to interpret one or more gestures in a target recognition, analysis, and tracking system and/or animate an avatar or on-screen character displayed by the target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 4:
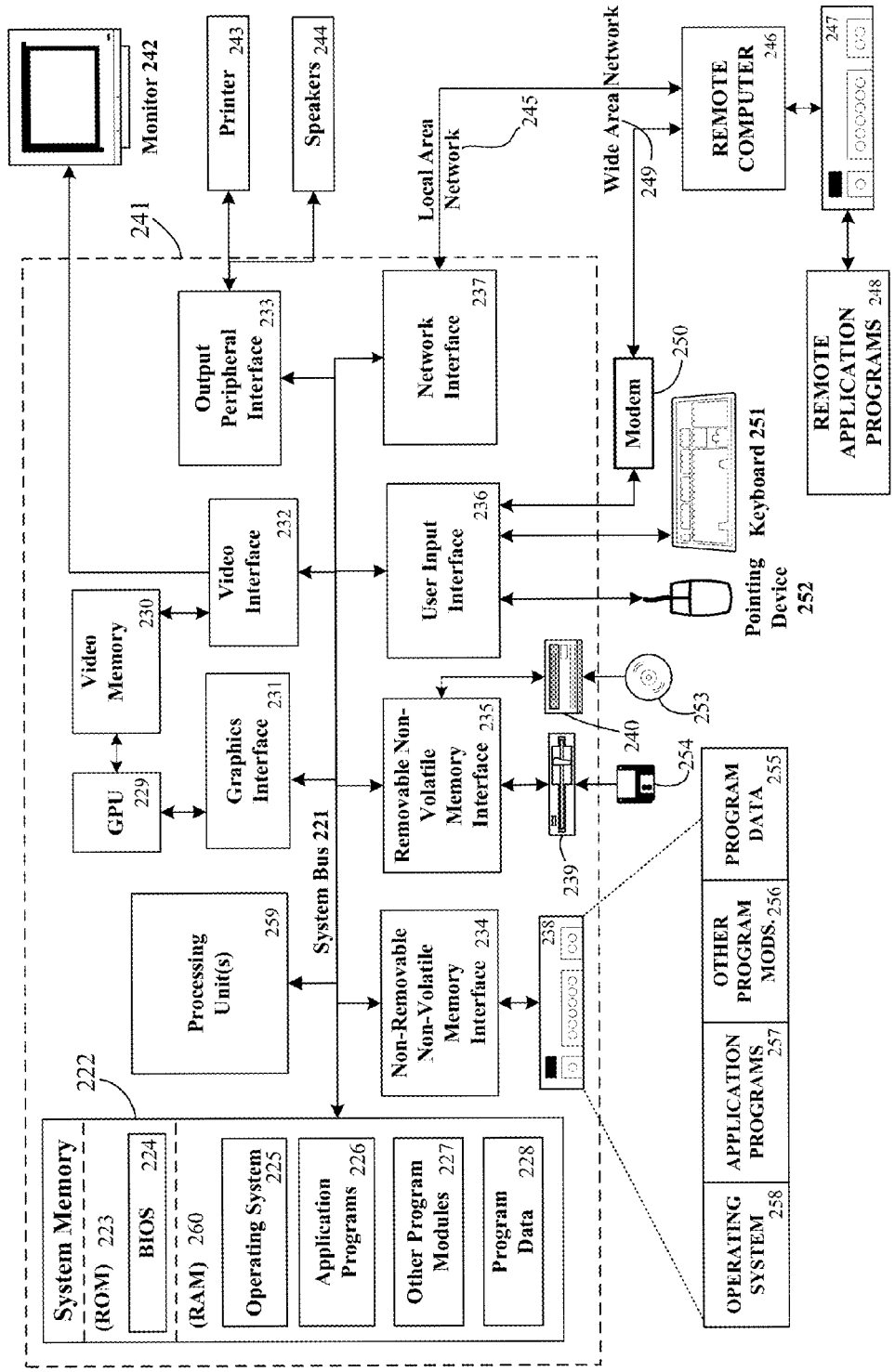
FIG. 4 illustrates another example embodiment of a computing environment that may be used to interpret one or more gestures in a target recognition, analysis, and tracking system and/or animate an avatar or on-screen character displayed by a target recognition, analysis, and tracking system.

FIG. 4 illustrates another example embodiment of a computing environment 220 that may be the computing environment 12 shown in FIGS. 1A-2 used to interpret one or more gestures in a target recognition, analysis, and tracking system and/or animate an avatar or on-screen character displayed by a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
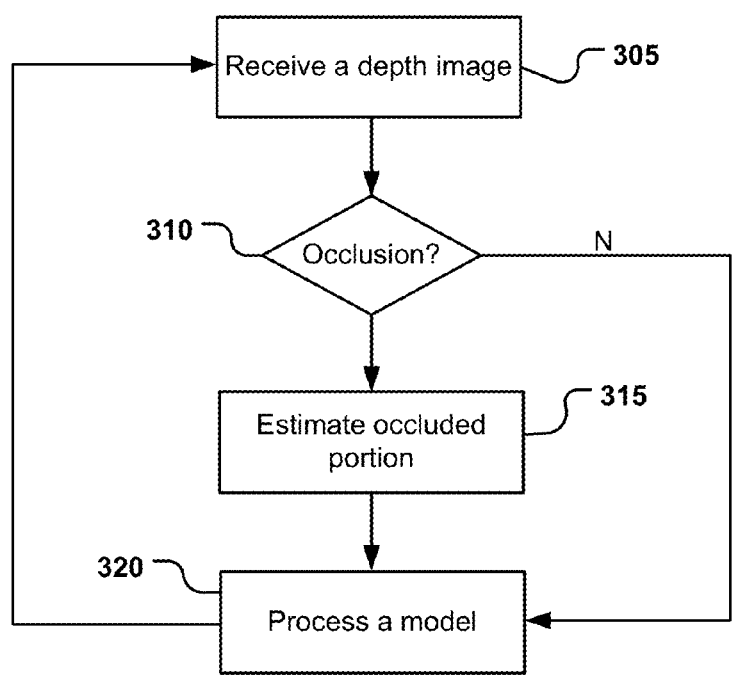
FIG. 5 depicts a flow diagram of an example method for estimating a non-visible portion an object in a depth image.

FIG. 5 depicts a flow diagram of an example method 300 for estimating a non-visible portion an object in a depth image. The example method 300 may be implemented using, for example, the capture device 20 and/or the computing environment 12 of the target recognition, analysis, and tracking system 10 described with respect to FIGS. 1A-4. In an example embodiment, the example method 300 may take the form of program code (i.e., instructions) that may be executed by, for example, the capture device 20 and/or the computing environment 12 of the target recognition, analysis, and tracking system 10 described with respect to FIGS. 1A-4.

According to one embodiment, at 305, a depth image may be received. For example, the target recognition, analysis, and tracking system may include a capture device such as the capture device 20 described above with respect to FIGS. 1A-2. The capture device may capture or observe a scene that may include one or more targets. In an example embodiment, the capture device may be a depth camera configured to obtain an image such as an a depth image of the scene using any suitable technique such as time-of-flight analysis, structured light analysis, stereo vision analysis, or the like.

The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Figure 6:
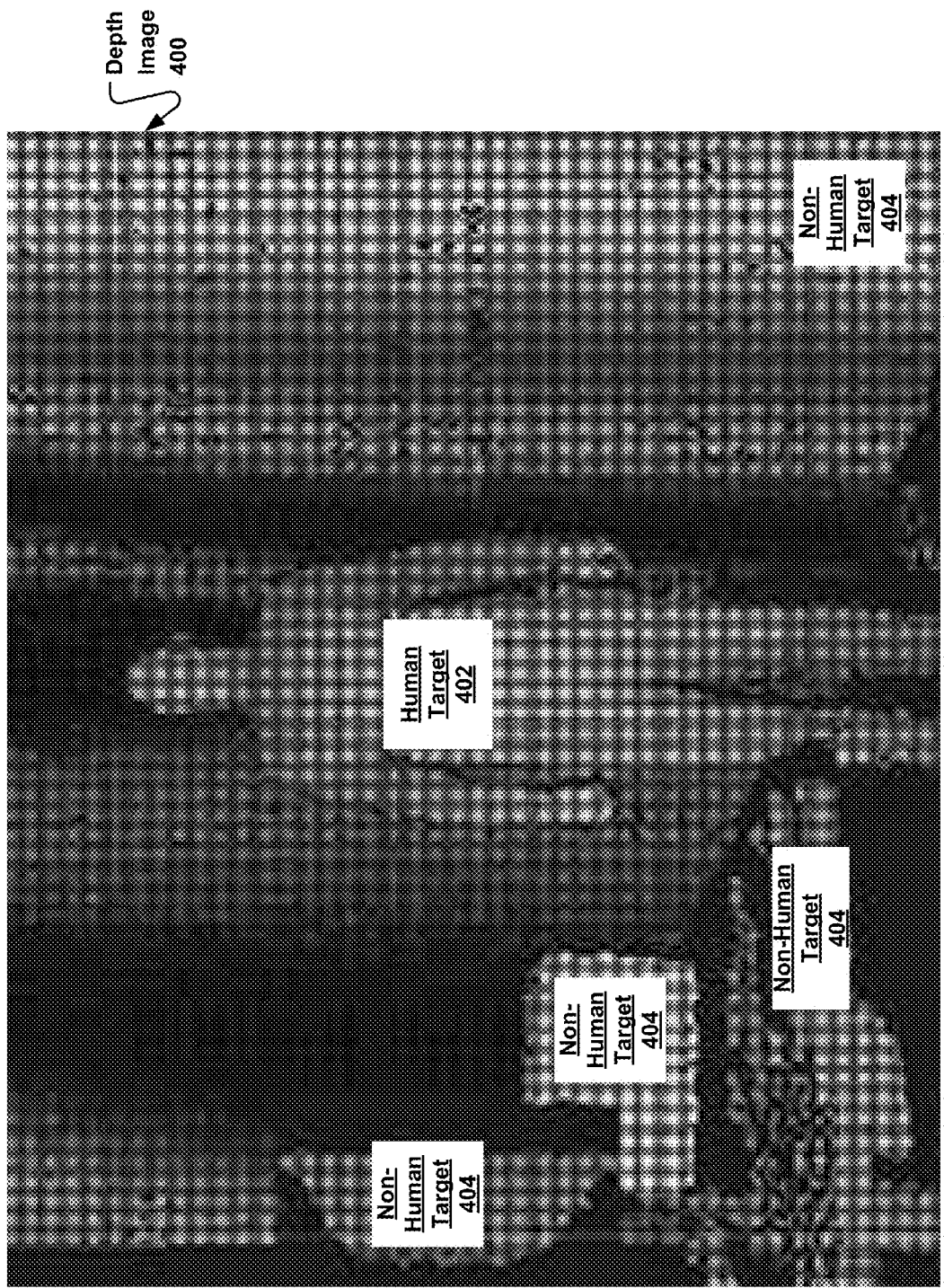
FIG. 6 illustrates an example embodiment of a depth image that may be captured or observed.

FIG. 6 illustrates an example embodiment of a depth image 400 that may be received at 305. According to an example embodiment, the depth image 400 may be an image or frame of a scene captured by, for example, the 3-D camera 26 and/or the RGB camera 28 of the capture device 20 described above with respect to FIG. 2. As shown in FIG. 6, the depth image 400 may include a human target 402 corresponding to, for example, a user such as the user 18 described above with respect to FIGS. 1A and 1B and one or more non-human targets 404 such as a wall, a table, a monitor, or the like in the captured scene. As described above, the depth image 400 may include a plurality of observed pixels where each observed pixel has an observed depth value associated therewith. For example, the depth image 400 may include a two-dimensional (2-D) pixel area of the captured scene where each pixel in the 2-D pixel area may have a depth value such as a length or distance in, for example, centimeters, millimeters, or the like of a target or object in the captured scene from the capture device. In one embodiment, the depth image 400 may be colorized such that different colors of the pixels of the depth image correspond to and/or visually depict different distances of the human target 402 and non-human targets 404 from the capture device. For example, according to one embodiment, the pixels associated with a target closest to the capture device may be colored with shades of red and/or orange in the depth image whereas the pixels associated with a target further away may be colored with shades of green and/or blue in the depth image.

Referring back to FIG. 5, in one embodiment, upon receiving the depth image, at 305, the depth image may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, which will be described in more detail below.

Additionally, upon receiving the depth image, at 305, a human target in the depth image may be scanned for one or more body parts. For example, upon receiving a depth image, the target recognition, analysis, and tracking system may determine whether the depth image includes a human target such as the human target 402 described above with respect to FIG. 6 corresponding to, for example, a user such as the user 18, described above with respect to FIGS. 1A-1B. In one embodiment, to determine whether the depth image includes a human target, the target recognition, analysis, and tracking system may flood fill each target or object in the depth image and may compare each flood filled target or object to a pattern associated with a body model of a human in various positions or poses. The flood filled target, or the human target, that matches the pattern may then be scanned to determine values including, for example, measurements such as length, width, or the like associated with one or more body parts. For example, the flood filled target, or the human target, that matches the pattern may be isolated and a mask such as a binary mask of the human target may be created. The mask may be created by, for example, flood filling the human target such that the human target may be separated from other targets or objects in the scene elements. The mask may then be analyzed to determine the location and/or measurements of one or more body parts.

Additionally, upon receiving the depth image at 305, a model such as a skeletal model of the human target may be generated based on the scan. For example, according to one embodiment, various points or body parts determined by the scan may be used to position one or more joints in a model such as a skeletal. The one or more joints may define one or more bones that may correspond to a body part of a human.

Figure 7:
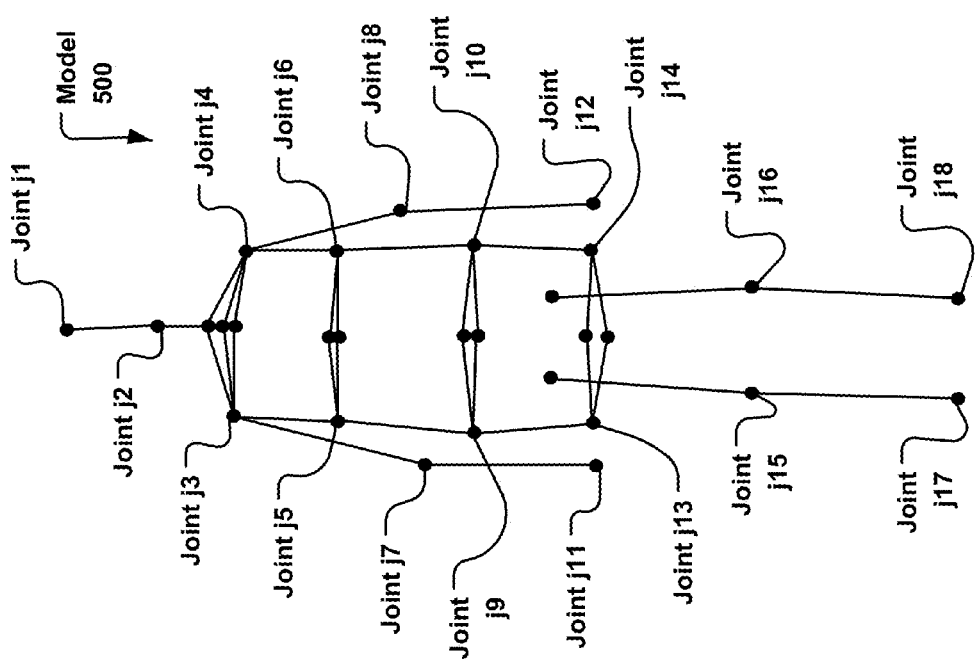
FIG. 7 illustrates an example embodiment of a model that may be generated based on a human target in a depth image.

FIG. 7 illustrates an example embodiment of a model 500 such as a skeletal model that may be generated based on a human target such as the human target 402 described above with respect to FIG. 6. According to an example embodiment, the model 500 may include one or more data structures that may represent, for example, the human target 402 described above with respect to FIG. 6 as a three-dimensional model. Each body part may be characterized as a mathematical vector having X, Y, and Z values that may define joints and bones of the model 500.

As shown in FIG. 7, the model 500 may include one or more joints j1-j18. According to an example embodiment, each of the joints j1-j18 may enable one or more body parts defined there between to move relative to one or more other body parts. For example, a model representing a human target may include a plurality of rigid and/or deformable body parts that may be defined by one or more structural members such as "bones" with the joints j1-j18 located at the intersection of adjacent bones. The joints j1-18 may enable various body parts associated with the bones and joints j1-j18 to move independently of each other. For example, the bone defined between the joints j8 and j12, shown in FIG. 7, corresponds to a forearm that may be moved independent of, for example, the bone defined between joints j15 and j17 that corresponds to a calf.

Figure 8:
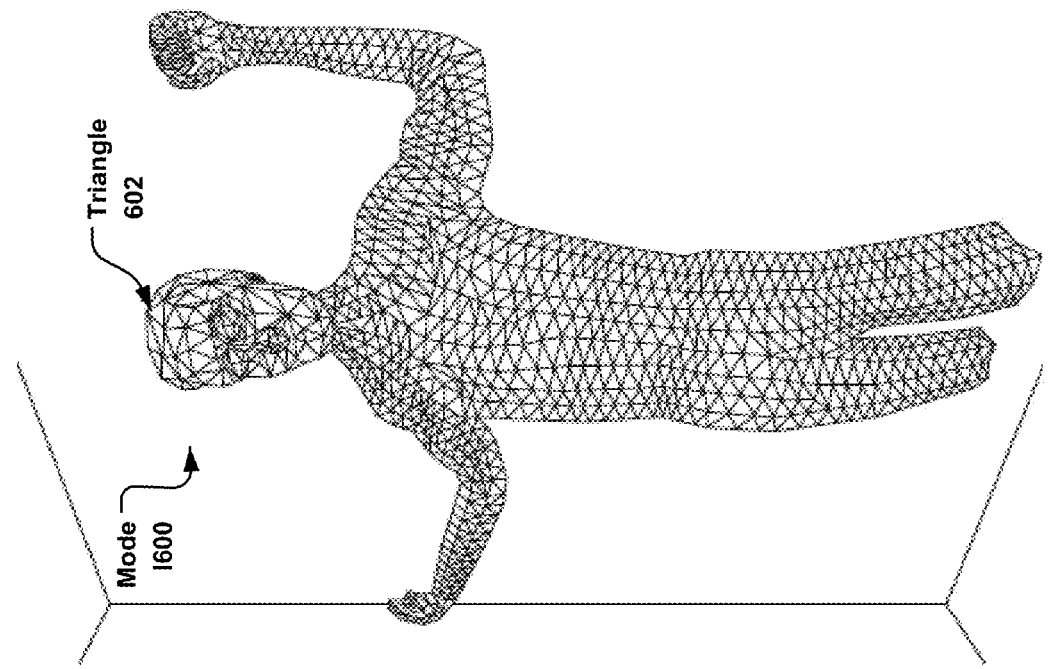
FIG. 8 illustrates another example embodiment of a model that may be generated based on a human target in a depth image.

FIG. 8 illustrates another example embodiment of a model 600 such as a mesh or polygonal model that may be generated based on a human target such as the human target 402 described above with respect to FIG. 6. According to an example embodiment, the model 600 may include one or more data structures that may represent, for example, the human target 402 described above with respect to FIG. 6 as a three-dimensional model. For example, the model 600 may include a wireframe mesh that may have hierarchies of rigid polygonal meshes, one or more deformable meshes, or any combination of thereof. According to an example embodiment, the mesh may include bending limits at each polygonal edge. As shown in FIG. 8, the model 600 may include a plurality of triangles (e.g., triangle 602) arranged in a mesh that defines the shape of the body model including one or more body parts.

Referring back to FIG. 5, at 310, a determination may be made regarding whether a portion of human target in the depth image may be non-visible or occluded. For example, the target recognition, analysis, and tracking system may determine whether one or more body parts of the human target such as the human target 402 may be occluded in the depth image such that the one or more body parts may not have an X value, a Y value, and a depth value associated therewith. That is, in an example embodiment, a user such as the user 18 described above with respect to FIGS. 1A and 1B may have a body part that may not be visible to the capture device. For example, the user may have a body part such as an arm behind his or her back, may be standing behind an object such as a table, may be standing sideways, may have a body part behind another user, may be partially outside of a field of view associated with the capture device, or the like. The capture device such as the capture device 20 described above with respect to FIGS. 1A-2 may then receive, observe, or capture a scene with the body part of the user not visible such that the human target associated with the user in the depth image may not have X values, Y values, and depth values for the occluded or non-visible body parts of the user. At 310, the target recognition, analysis, and tracking system may analyze the received depth image to determine whether one or more body parts of the human target associated with the user may be non-visible or occluded.

According to an example embodiment, a background such as the non-human targets of a depth image may be removed to isolate a human target in a received depth image before the target recognition, analysis, and tracking system may determine whether a portion of the human target may be occluded at 310. For example, as described above, the target recognition, analysis, and tracking system may receive capture or observe depth image of a scene in frames. The target recognition, analysis, and tracking system may analyze each received depth image in a frame to determine whether a pixel may be associated with a background of the depth image. If a pixel may be associated with a background object such as one or more non-human targets, the pixel may be removed or discarded from the depth image such that the human target may be isolated in the depth image. The target recognition, analysis, and tracking system may then analyze the depth image with the isolated human target to determine whether one or more body parts of the human target may be non-visible or occluded.

Figure 9:
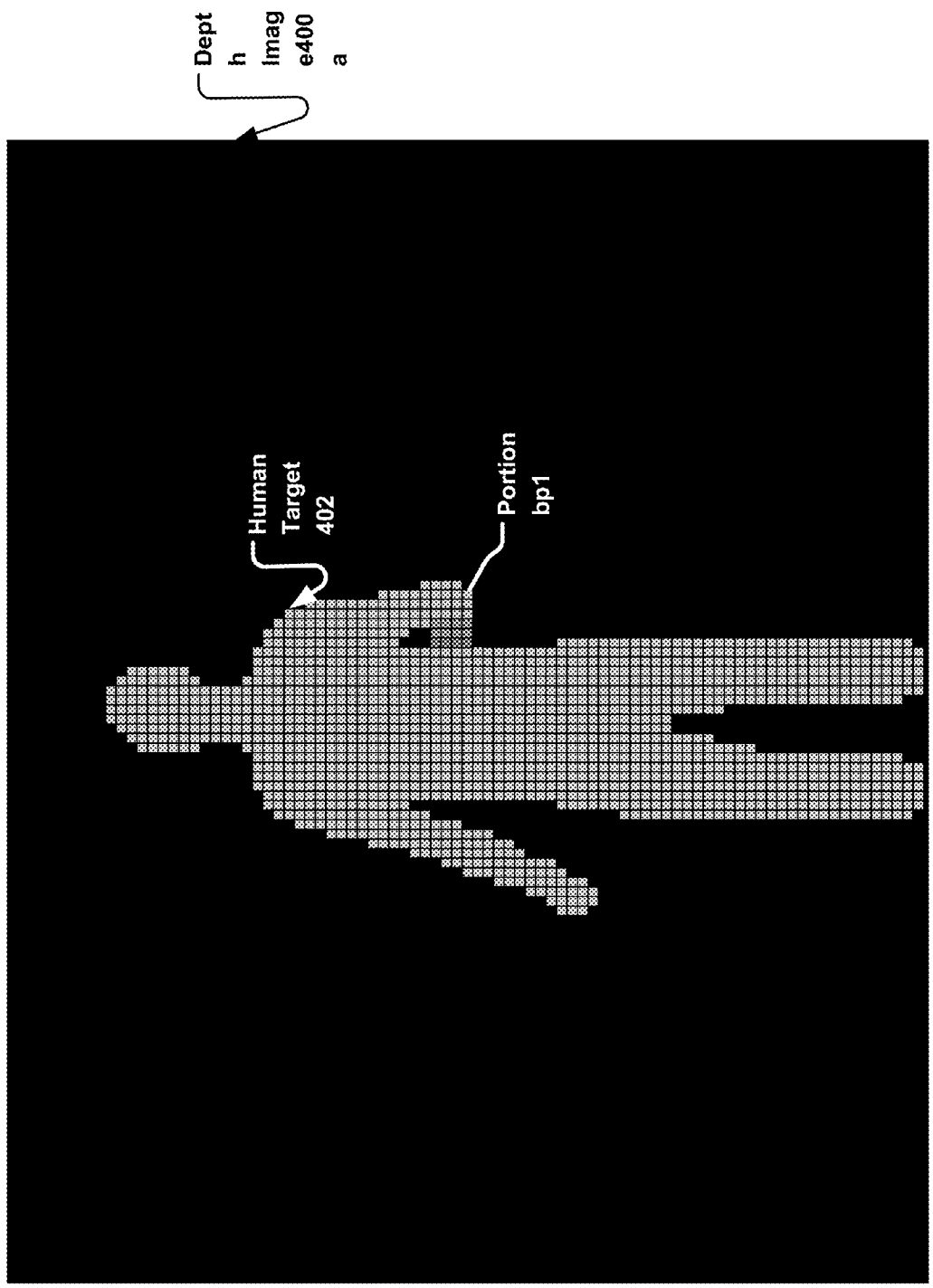
FIG. 9 illustrates an example embodiment of a depth image with a portion of a human target occluded.
Figure 10:
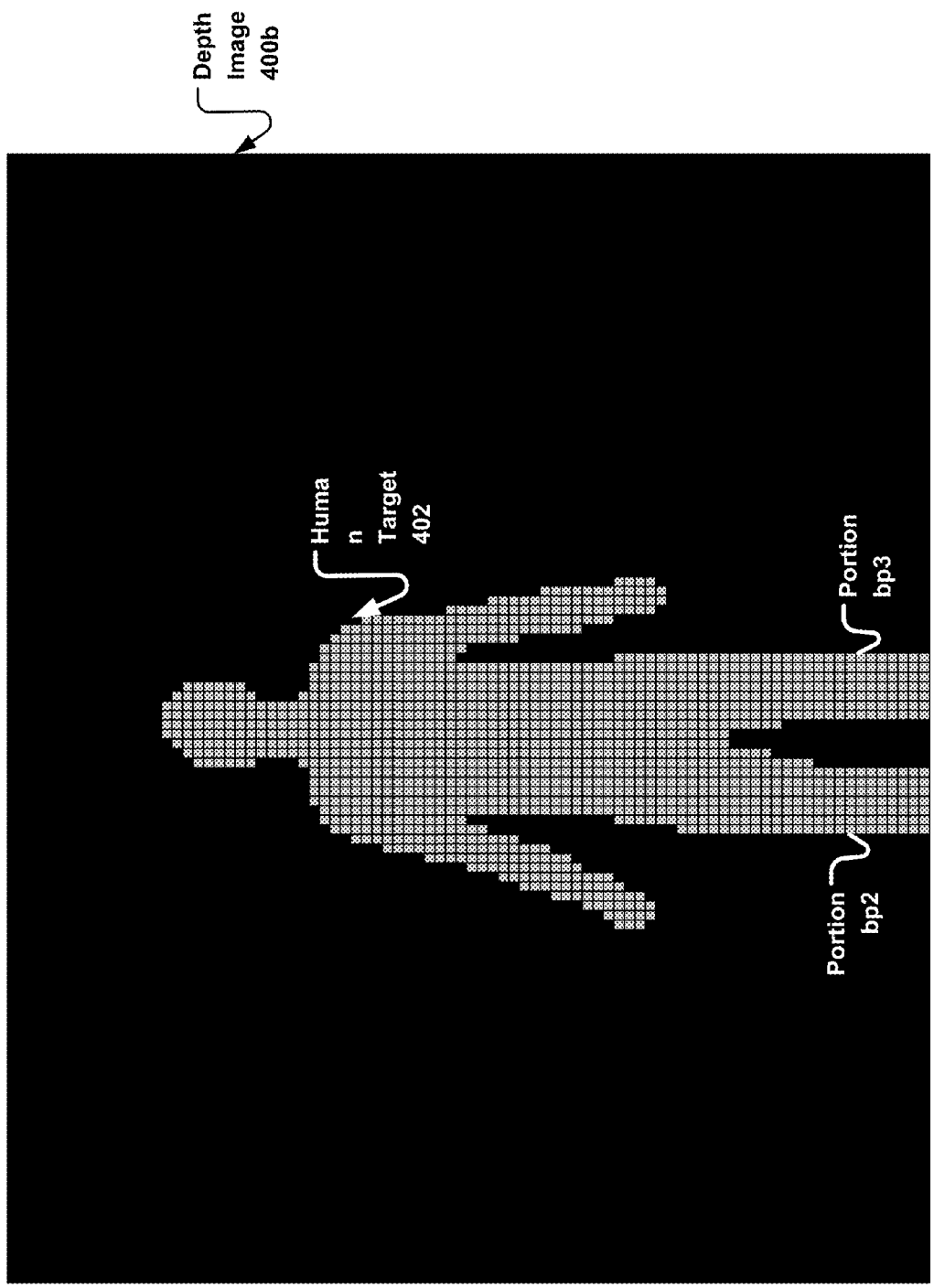
FIG. 10 illustrates an example embodiment of a depth image with a portion of a human target occluded.
Figure 11:
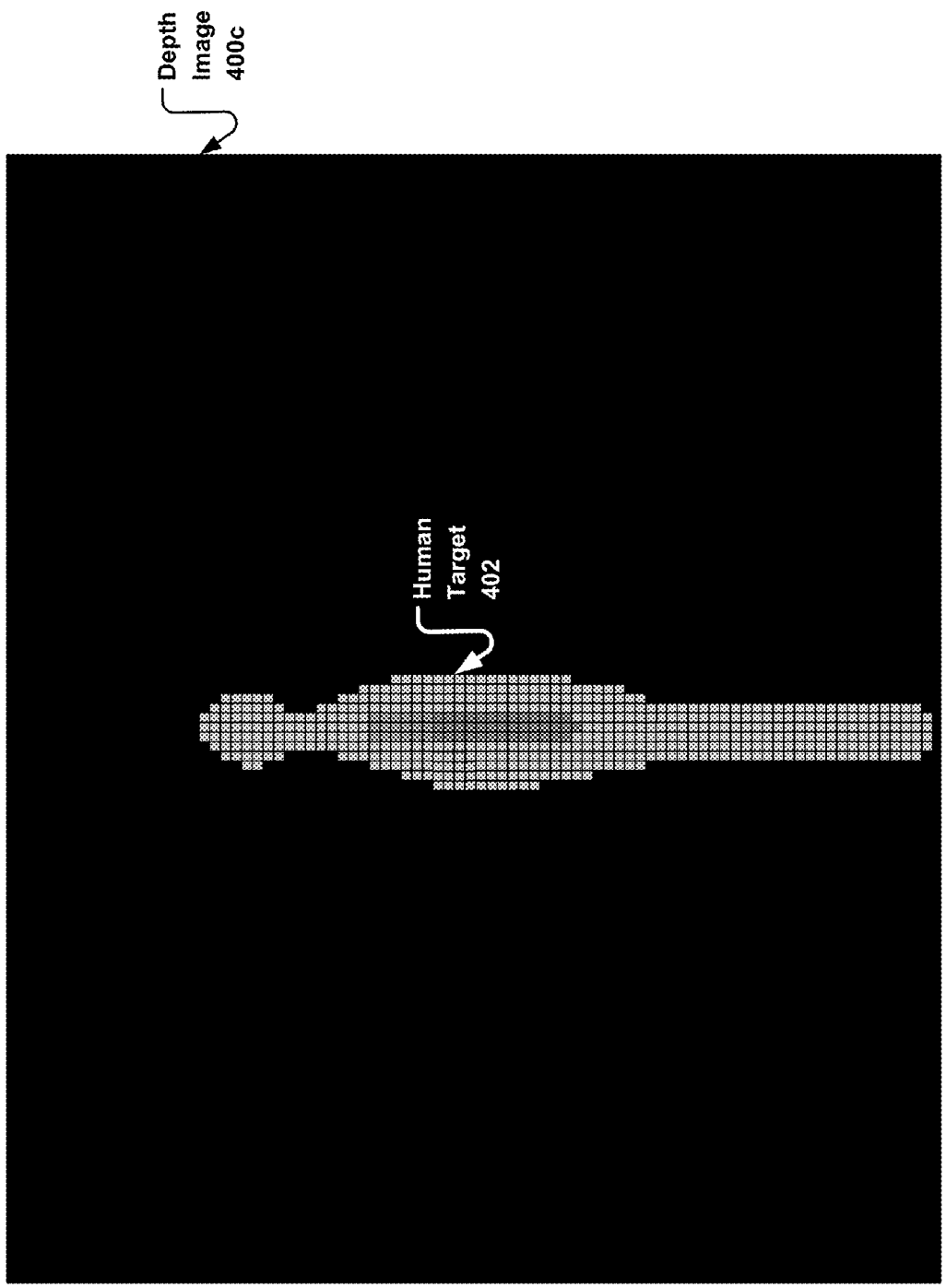
FIG. 11 illustrates an example embodiment of a depth image with a portion of a human target occluded.

FIGS. 9-11 illustrate example embodiments of depth images with a portion of a human target non-visible or occluded. As shown in FIG. 9, a depth image 400a that may be received may include the human target 402 with a portion thereof occluded. According to an example embodiment, the depth image 400a may include a depth image that may be received in a subsequent frame than the depth image 400 described above with respect to FIG. 6. In one embodiment, a body part b1 such as the left arm of the human target 402 may be occluded behind a torso of the human target 402 as shown in FIG. 9. For example, the user such as the user 18 described above with respect to FIGS. 1A and 1B may move his or her left arm behind his or her back such that the human target 402 in depth image 400a that may be received, observed, or captured may have the left arm associated therewith behind the torso as shown bp1 in FIG. 9.

As shown in FIG. 10, a depth image 400b that may be received may include the human target 402 with a portion thereof occluded. According to an example embodiment, the depth image 400b may include a depth image that may be received in a subsequent frame than the depth image 400 described above with respect to FIG. 6. In one embodiment, a body part b2 and a body part b3 such as the left and right legs of the human target 402 may be not be in the depth image 400b as shown in FIG. 10. For example, one or more body parts such as the feet of the user such as the user 18 described above with respect to FIGS. 1A and 1B may be partially outside a field of view of the capture device such as the capture device 20 described above with respect to FIGS. 1A-2 such that the human target 402 in depth image 400b that may be received, observed, or captured may have the left and right legs cut off in the depth image 400b as shown by bp2 and bp3 in FIG. 10.

As shown in FIG. 11, a depth image 400c that may be received may include the human target 402 with a portion thereof occluded. According to an example embodiment, the depth image 400c may include a depth image that may be received in a subsequent frame than the depth image 400 described above with respect to FIG. 6. In one embodiment, a body part b4 (not shown) such as the right arm of the human target 402 may be occluded behind a torso of the human target 402 as shown in FIG. 11. For example, the user such as the user 18 described above with respect to FIGS. 1A and 1B may turn sideways such that the human target 402 in depth image 400c that may be received, observed, or captured may have the right arm associated therewith behind the torso as shown in FIG. 11.

Referring back to FIG. 5, at 315, the non-visible or occluded portion of the human target may be estimated. For example, the target recognition, analysis, and tracking system may estimate a position or location of the non-visible or occluded portion of the human target such as the body parts b1-b4 described above with respect to FIGS. 9-11 such that target recognition, analysis, and tracking system may use the estimated position or location of the occluded portion to process a model such as the model 500 and/or the model 600 described above with respect to FIGS. 7-8, may optimally pick up the non-visible or occlude portion upon re-emergence or when the portion may become visible to the capture device, or the like.

According to an example embodiment, the non-visible or occluded portion of the human target may be estimated based on non-occluded portions of the human target. For example, upon receiving a depth image such as the depth images 400a-400c, information associated with the depth image may be compared to information associated with the model to determine whether a movement may have been performed by the user and, thus, whether to adjust the model associated with the user. For example, in one embodiment, the model may be rasterized into a synthesized depth image. Pixels in the synthesized image may be compared to pixels associated with the non-occluded portions of the human target in the received depth images to determine whether to, for example, adjust the model.

According to an example embodiment, one or more translations may be computed based on the pixels compared between the synthesized image and the received depth image. According to an example embodiment, the one or more translations may include one or more force vectors that may be computed based on the pixels compared between, for example, the synthesized image and the received depth image. The one or more translations such as the one or more force vectors may then be applied or mapped to one or more force-receiving aspects such as the joints of the model that may be associated with a non-occluded portion of the human target to adjust the model into a pose that more closely corresponds to the pose of the human target associated with the user in physical space.

Thus, according to an example embodiment, the target recognition, analysis, and tracking system may compare non-occluded or visible portion of the human target in a received depth image with the model to determine whether a mismatch such as a gap may exist between silhouettes of the human target and the model. The target recognition, analysis, and tracking system may then adjust or push the model into the shape or position of the non-occluded or visible portion of the human target in the X and/or Y direction (via silhouettes or X and Y values) and in the Z direction (via Z values) such that the model may more closely correspond to the pose of the human target associated with the user in physical space.

In one embodiment, the target recognition, analysis, and tracking system may use the one or more translations that may be applied or mapped to, for example, the joints of the model that may be associated with the non-occluded portion of the human target to estimate the position or location of an occluded joint that may be associated with a body part of the human target. For example, if a knee of a human target may be non-visible or occluded in a depth image, the target recognition, analysis, and tracking system may position the knee based on the position including the X, Y, and Z values of the hip of the human target. Thus, in an example embodiment, if the hip may have moved 10 centimeters in an X direction and 5 centimeters in a Y direction between two depth images captured or observed in subsequent frames, the target recognition, analysis, and tracking system may drag the knee based on the hip by pushing or pulling the knee 10 centimeters in the X direction and 5 centimeters in the Y direction.

Figure 12:
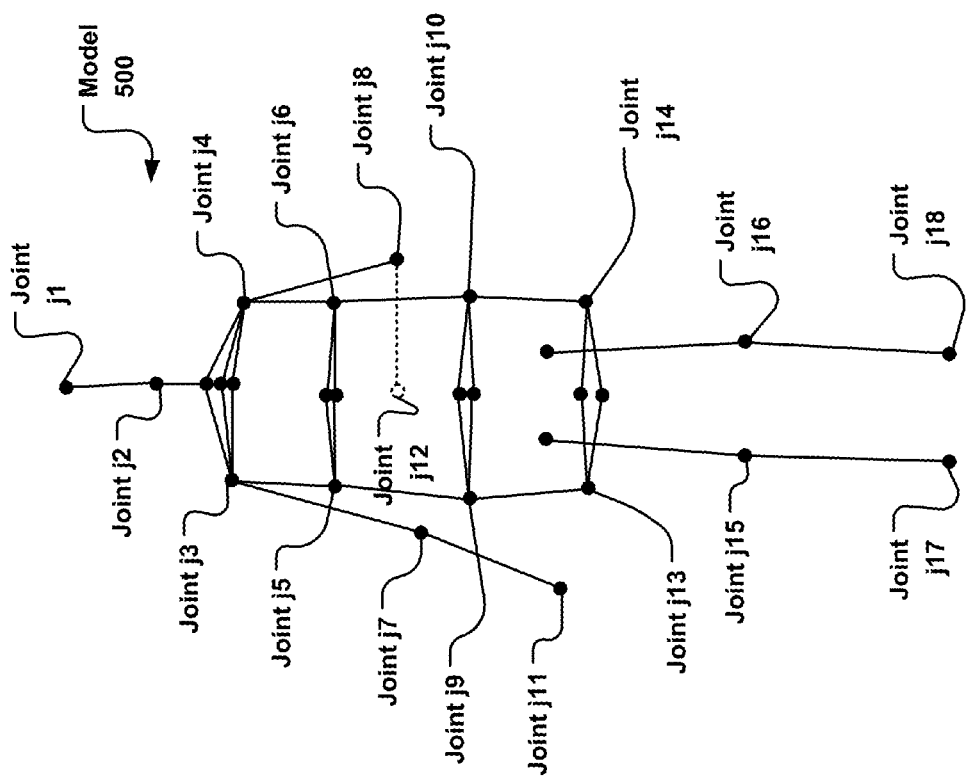
FIG. 12 illustrates an example embodiment of a model associated with a human target with a body part that may be estimated.

FIG. 12 illustrates an example embodiment of the model 500 associated with a human target with a body part that may be estimated at 315. As shown in FIG. 9, a portion of the body part b1 such as the left arm may be behind the torso of the human target 402. In one embodiment, upon detecting that the body part b1 may be non-visible or occluded behind, for example, the torso of the human target at 310, the target recognition analysis, and tracking system may position or drag, for example, a joint of the model such as the joint j12 associated with the body part b1 behind the torso of the model such that the joint j12 may drift behind the model.

The target recognition, analysis, and tracking system may then generate, for example, an estimated X, Y, and/or Z value of the joint such as the joint j12 that may be positioned or dragged behind the torso. For example, as described above, the target recognition, analysis, and tracking system may compute one or more translations such as one or more force vectors for the non-occluded body parts and may map those translations to the corresponding joints and/or bones such as joints j1-j11 and j13-j18 to adjust the model to correspond to the human target 402 in the depth image 400a. Using the translations such as the force vectors associated with, for example, the joints j4 and j8, the target recognition, analysis, and tracking system may estimate a location or position including, for example, an X, Y, and/or Z value for the body part associated with the joint j12. For example, the target recognition, analysis, and tracking system may use the momentum, rotation, velocity, trajectory, or the like of the joint j8 determined using, for example, the translations such as the force vectors to estimate a location or position including, for example, an X, Y, and Z value for the body part associated with the joint j12.

Figure 13:
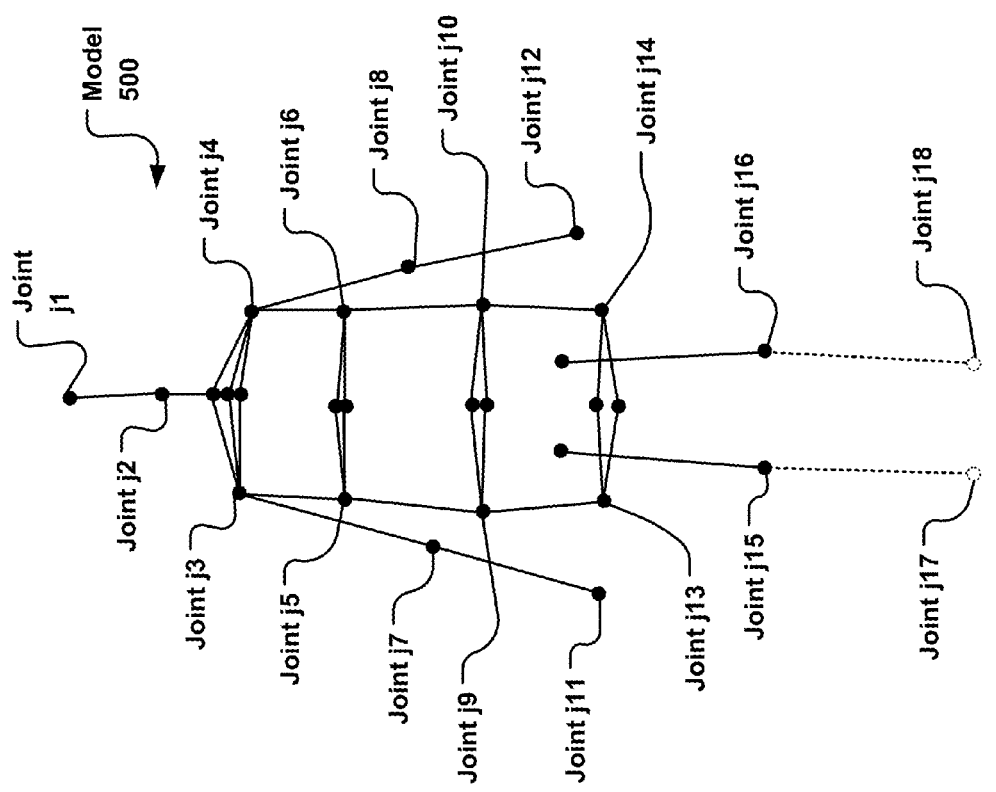
FIG. 13 illustrates an example embodiment of a model associated with a human target with a body part that may be estimated.

FIG. 13 illustrates another example embodiment of the model 500 associated with a human target with a body part that may be estimated at 315. As shown in FIG. 10, the body parts b2 and b3 such as the left and right legs may not be within the depth image 400b, because the feet of the user may be partially outside the field of view of the capture device. In one embodiment, upon detecting that the body parts b2 and b3 may be non-visible or outside the field of view of the capture device at 310, the target recognition analysis, and tracking system may position such as push or pull, for example, joints of the such as the joints j17 and j18 associated with the body parts b2 and b3 in, for example, an X direction, a Y direction, or a Z direction based on one or more non-occluded or visible body parts.

For example, as described above, the target recognition, analysis, and tracking system may compute one or more translations such as force vectors for the non-occluded body parts and may map those translations to the corresponding joints and/or bones such as joints j1-j16 to adjust the model to correspond to the human target 402 in the depth image 400a. Using the translations such as the force vectors associated with, for example, the joints j1-j16, the target recognition, analysis, and tracking system may estimate a location or position including, for example, an X, Y, and/or Z value for the body part such as the feet that may be associated with the joints j17 and j18. For example, in one embodiment, if the hip and/or knee associated with the joint j13 and j15 may move 10 centimeters in an X-direction the joint j17 may be pushed or pulled by 10 centimeters in the X direction.

Additionally, the target recognition, analysis, and tracking system may use the momentum, rotation, velocity, trajectory, or the like of the joints j13 and j15 determined using the translations such as the force vectors to estimate a location or position including, for example, an X, Y, and Z value for the right foot associated with the joint j17. Similarly, the target recognition, analysis, and tracking system may use the momentum, rotation, velocity, trajectory, or the like determined using the translations such as the force vectors to estimate a location or position including, for example, an X, Y, and Z value for the left foot associated with the joint j18.

According to another example embodiment, the target recognition, analysis, and tracking system may store historical data associated with the model and/or the received, observed, or captured depth images. The target recognition analysis, and tracking system may then use the historical data to estimate a position or location of an occluded portion of the human target. For example, as shown in FIG. 11, a body part b4 (not shown) such as the right arm may be occluded behind the torso of the human target 400. In one embodiment, the target, recognition, analysis, and tracking system may estimate the position or location of the body part bp4 based on the position and/or location of the body part bp4 in one or more depth images previously received, captured, or observed where the body part bp4 may be visible. For example, the target recognition, analysis, and tracking system may use the X value, the Y value, the Z value, a force vector, momentum, velocity, rotation, trajectory, or the like of the body part b4 in previously received depth images where the body part bp4 may be visible to detect the position or the location of the body part bp4 when the body part bp4 may be occluded or non-visible in a subsequently received depth image.

According to one embodiment, the target recognition, analysis, and tracking system may capture depth images in frames that may be observed or received at a frequency such as 15 frames per second, 20 frames per second, 30 frames per second, or the like. Based on the frequency, the target recognition, analysis, and tracking system may estimate a range of possible movement in any given direction for each body part. The target recognition, analysis, and tracking system may then use the range in addition to historical data such as a previous known position or location including the X, Y, and Z values of the occluded body part to estimate a current location and/or a position of the occluded body part.

The target recognition, analysis, and tracking system may also include a storage component such as a database that may include one or more classification trees that may be used to identify one or more body parts of the human target, identify a location or a position of one or more body parts of the human target, or the like. For example, in one embodiment, upon receiving a depth image, the target recognition, analysis, and tracking system may analyze and classify each pixel associated with a human target to determine a body part that may be associated with the pixel, a location of the pixel with respect to a body part, a pose of the human target, or the like. According to one embodiment, the target recognition, analysis, and tracking system estimate a non-visible portion of the human target such as a body part based on the visible pixels analyzed using the classification trees. For example, if non pixels associated with a left wrist may be identified based on the analysis using the classification trees, the target recognition analysis, and tracking system may push or pull, for example, the left wrist behind a torso. The target recognition, analysis, and tracking system may then use information such as the X, Y, and/or Z values associated with a pixel that may be identified by the analysis as being associated with the left elbow to estimate a location or position as described above.

In another example embodiment, the target recognition, analysis, and tracking system may use a combination of the translations such as force vectors for the non-occluded body parts, historical data, classification trees, or the like. For example, in one embodiment, the target recognition, analysis, and tracking system may initially estimate the location or the position of a body part that may be occluded by using the translations such as the force vectors. Then, the target recognition, analysis, and tracking system may modify the initial estimation based on the historical data.

Additionally, the target recognition, analysis, and tracking system may generate a confidence value associated with the estimated body part and/or joint. For example, in one embodiment, upon estimating a position or location of an occluded or non-visible body part of a human target such as the human target 402, the target recognition, analysis, and tracking system may calculate a confidence value associated with the estimated body part. The confidence value may include an indication of, for example, a probability of the position or location of the estimated body part being accurate.

According to an example embodiment, the target recognition, analysis, and tracking system may provide the confidence value to, for example, a gestures library, an application executing on a computing environment, or the like that may process the model with the estimated body part such that the gestures library, the application, or the like may use the confidence value in determining, for example, whether to perform a control, animation, or the like using the estimated body part or joint. For example, the target recognition, analysis, and tracking system may calculate a low confidence value such as 10 for a non-visible or occluded body part associated with a foot of a user. In one embodiment, the target recognition, analysis, and tracking system may provide the confidence value of 10 along with the model including the estimated body part to a soccer game application. The soccer game application may use the confidence value to determine whether to perform an action associated with kicking a soccer ball using the foot. Thus, in an example embodiment, the confidence value may be provided to an application, gestures library, or the like such that the application, gestures library, or the like may use the confidence value to determine whether to use the estimated body part.

Referring back to FIG. 5, at 320, the model may be processed. For example, the model may be tracked based the estimated portion or body part. Additionally, in one embodiment, the target recognition, analysis, and tracking system may also generate a motion capture file of the model with the estimated body part and/or may map one or more motions or movements applied to the model with the estimated body part to a virtual character or object such as an avatar, a game character, a game object, or the like such that the virtual character or object may be animated to mimic the user such as the user 18 described above with respect to FIGS. 1A and 1B. For example, the visual appearance of an on-screen character may be changed in response to changes to the model being adjusted.

Additionally, the model may be provided to a computing environment such as the computing environment 12 described above with respect to FIGS. 1A-4. The computing environment may include a gestures library that may be used to determine controls to perform within an application based on positions of various body parts in the model.

In one embodiment, the model may be processed at 325, based on the confidence value of the estimated portion or body part. For example, as described above, the target recognition, analysis, and tracking system may generate a confidence value of the estimated portion or body part. The confidence value may then be passed to, for example, the gestures library, an application, or the like such that the application, gestures library, or the like may determine whether to use, for example, the estimated body part based on the confidence value as described above.

According to one embodiment, when the non-visible or occluded portion or body part of the human target may re-emerge or may be visible or non-occluded in a subsequently received depth image, the target recognition, analysis, and tracking system may magnetize or adjust the estimated portion or body part to the one or more pixels associated with the body part in the depth image. For example, as described above, a synthesized depth image associated with the model may be compared with a received depth image to compute one or more translations such as one or more force vectors that may be mapped to the model such that the model may be adjusted based on one or more movements by the user associated with the human target in the received depth images. In one embodiment, when a pixel associated with a body part that may have been non-visible or occluded in a previous depth image becomes visible in a subsequently received depth image, the target recognition, analysis, and tracking system may recognize the pixel as being associated with the body part, may compute translations such as force vectors for the now visible body part, and may apply or map the force vectors to the corresponding body part of the model.

Additionally, as described above, the target recognition, analysis, and tracking system may include a storage component such as a database that may include one or more classification trees that may be used to identify one or more body parts of the human target, identify a location or a position of one or more body parts of the human target, or the like. For example, in one embodiment, upon receiving a depth image, the target recognition, analysis, and tracking system may analyze and classify each pixel associated with a human target to determine a body part that may be associated with the pixel, a location of the pixel with respect to a body part, a pose of the human target, or the like. When a pixel associated with a body part that may have been occluded or non-visible may become visible in a subsequently received depth image, the pixel may be analyzed using the classification trees to determine the body part associated therewith, a location or a position of the body part, or the like. The model may then be adjusted based on the identified body part, the location or position of the identified body part, or the like. Thus, in an example embodiment, the classification tree may provide information such as a location or position that may be used to adjust a previously estimated, non-visible body part when the body part may become visible in a subsequently received depth image.

Thus, according to one embodiment, the target recognition, analysis, and tracking system may include an occlusion component or module that may act as an 'occlusion zone' for hidden body parts. That is, if a leg is behind a human target associated with a user, the position or location of the leg may be estimated and the body part of the model associated with the leg may be forced to stay behind, for example, the torso of the model in the 'occlusion zone' until the leg re-emerges in a subsequently received depth image. When the leg re-emerges, the target recognition, analysis, and tracking system may pick up the location of the leg based on the location or position of the leg in the 'occlusion zone' based on one or more translations such as force vectors as described above, a pixel based analysis using the classification tree as described above, historical data as described above, and/or any combination thereof.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed:

1. A method comprising:
   receiving a depth image of a scene;
   determining that a portion of a human target in the depth image is non-visible;
   estimating a position of the non-visible portion of the human target, wherein the estimating comprises:
      generating an initial estimation of the position of the non-visible portion of the human target based at least in part on force vectors associated with a visible portion of the human target; and
      modifying the initial estimation based at least in part on historical data associated with the non-visible portion, wherein the historical data comprises data associated with a previously received depth image where the non-visible portion is visible, wherein the historical data comprises at least one of an X value, a Y value, or a Z value of the non-visible portion in the previously received depth image where the non-visible portion is visible;
   determining a new position of the non-visible portion when a pixel associated with the non-visible portion becomes visible in a subsequent depth image.

2. The method of claim 1, wherein estimating the position of the non-visible portion of the human target further comprises dragging the non-visible portion of the human target behind the visible portion of the human target, wherein the non-visible portion drifts behind the visible portion of the human target.

3. The method of claim 1, wherein estimating the position of the non-visible portion of the human target further comprises generating at least one of the following: an estimated X value, an estimated Y value, and an estimated Z value for the non-visible portion.

4. The method of claim 3, wherein the estimated X value, the estimated Y value, and the estimated Z value are generated based on the visible portion of the human target.

5. The method of claim 4, wherein the estimated X value, the estimated Y value, and the estimated Z value of the non-visible portion is generated based on at least one of the following: an X value of the visible portion, a Y value of the visible portion, a Z value of the visible portion, momentum of the visible portion, a velocity of the visible portion, a rotation of the visible portion, or a trajectory of the visible portion.

6. The method of claim 3, further comprising:
   adjusting a model of the human target based on the estimated X value, the estimated Y value, and the estimated Z value; and processing the model of the human target with the estimated X value, the estimated Y value, and the estimated Z value.

7. A computer-readable storage device having stored thereon computer-executable instructions, the computer-executable instructions comprising instructions for:
   receiving a depth image of a scene;
   determining that a portion of a human target in the depth image is non-visible;
   estimating a position of the non-visible portion of the human target, wherein the estimating comprises:
      generating an initial estimation of the position of the non-visible portion of the human target based at least in part on force vectors associated with a visible portion of the human target; and
      modifying the initial estimation based at least in part on historical data associated with the non-visible portion, wherein the historical data comprises data associated with a previously received depth image where the non-visible portion is visible, wherein the historical data comprises at least one of an X value, a Y value, or a Z value of the non-visible portion in the previously received depth image where the non-visible portion is visible; and
   determining a new position of the non-visible portion when a pixel associated with the non-visible portion becomes visible in a subsequent depth image.

8. The computer-readable storage device of claim 7, wherein estimating the position of the non-visible portion of the human target further comprises dragging the non-visible portion of the human target behind the visible portion of the human target, wherein the non-visible portion drifts behind the visible portion of the human target.

9. The computer-readable storage device of claim 7, wherein estimating the position of the non-visible portion of the human target further comprises generating at least one of the following: an estimated X value, an estimated Y value, and an estimated Z value for the non-visible portion.

10. The computer-readable storage device of claim 9, wherein the estimated X value, the estimated Y value, and the estimated Z value are generated based on the visible portion of the human target.

11. The computer-readable storage device of claim 10, wherein the estimated X value, the estimated Y value, and the estimated Z value of the non-visible portion is generated based on at least one of the following: an X value of the visible portion, a Y value of the visible portion, a Z value of the visible portion, momentum of the visible portion, a velocity of the visible portion, a rotation of the visible portion, or a trajectory of the visible portion.

12. The computer-readable storage device of claim 9, wherein the computer executable instructions further comprise instructions for:
   adjusting a model of the human target based on the estimated X value, the estimated Y value, and the estimated Z value; and processing the model of the human target with the estimated X value, the estimated Y value, and the estimated Z value.

13. A system comprising:
   a capture device, wherein the capture device comprises a camera component operable to receive a depth image of a scene, wherein the depth image comprises a human target associated with a user; and
   a computing device operable to communicate with the capture device, wherein the computing device is operable to perform operations comprising:

determining that a portion of the human target in the depth image is non-visible;

estimating a position of the non-visible portion of the human target, wherein the estimating comprises:

generating an initial estimation of the position of the non-visible portion of the human target based at least in part on force vectors associated with a visible portion of the human target; and modifying the initial estimation based at least in part on historical data associated with the non-visible portion, wherein the historical data comprises data associated with a previously received depth image where the non-visible portion is visible, wherein the historical data comprises at least one of an X value, a Y value, or a Z value of the non-visible portion in the previously received depth image where the non-visible portion is visible; and determining a new position of the non-visible portion when a pixel associated with the non-visible portion becomes visible in a subsequent depth image.

14. The system of claim 13, wherein estimating the position of the non-visible portion of the human target further comprises dragging the non-visible portion of the human target behind the visible portion of the human target, wherein the non-visible portion drifts behind the visible portion of the human target.

15. The system of claim 13, wherein estimating the position of the non-visible portion of the human target further comprises generating at least one of the following: an estimated X value, an estimated Y value, and an estimated Z value for the non-visible portion.

16. The system of claim 15, wherein the estimated X value, the estimated Y value, and the estimated Z value are generated based on the visible portion of the human target.

17. The system of claim 16, wherein the estimated X value, the estimated Y value, and the estimated Z value of the non-visible portion is generated based on at least one of the following: an X value of the visible portion, a Y value of the visible portion, a Z value of the visible portion, momentum of the visible portion, a velocity of the visible portion, a rotation of the visible portion, or a trajectory of the visible portion.

18. The system of claim 15, wherein the operations further comprise:

adjusting a model of the human target based on the estimated X value, the estimated Y value, and the estimated Z value; and processing the model of the human target with the estimated X value, the estimated Y value, and the estimated Z value.

\* \* \* \* \*